United States Patent
Drennen et al.

(10) Patent No.: US 6,802,398 B2
(45) Date of Patent: Oct. 12, 2004

(54) MANUAL CABLE RELEASE APPARATUS FOR A MOTOR ACTUATED PARK BRAKE FOR A VEHICLE

(75) Inventors: David B. Drennen, Bellbrook, OH (US); Patrick A. Mescher, Bellbrook, OH (US); Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/186,860

(22) Filed: Jul. 1, 2002

(65) Prior Publication Data

US 2002/0162709 A1 Nov. 7, 2002

Related U.S. Application Data

(63) Continuation-in-part of application No. 10/040,521, filed on Jan. 7, 2002.
(60) Provisional application No. 60/261,954, filed on Jan. 16, 2001.

(51) Int. Cl.[7] .................................................. F16D 5/00
(52) U.S. Cl. ........................ 188/2 D; 188/265; 188/162; 74/502.6
(58) Field of Search ................................ 188/2 D, 162, 188/265; 74/500.5, 501.6, 501.5 R, 502.6

(56) References Cited

U.S. PATENT DOCUMENTS

| | | | | |
|---|---|---|---|---|
| 2,899,022 A | * | 8/1959 | White ......................... | 188/2 R |
| 4,629,043 A | * | 12/1986 | Matsuo et al. ............... | 477/184 |
| 4,934,503 A | * | 6/1990 | Bacher et al. ............ | 192/93 A |
| 5,004,077 A | * | 4/1991 | Carlson et al. ............. | 188/2 D |
| 5,855,529 A | * | 1/1999 | Sugimoto ..................... | 474/80 |
| 5,954,179 A | * | 9/1999 | Osborn ..................... | 192/219.5 |
| 6,244,394 B1 | * | 6/2001 | Gutierrez et al. .......... | 188/72.8 |
| 6,386,338 B1 | * | 5/2002 | Powrozek .................... | 188/156 |
| 6,401,879 B1 | * | 6/2002 | Drennen et al. ............ | 188/158 |
| 6,405,838 B1 | | 6/2002 | Shaw | |
| 6,435,320 B1 | | 8/2002 | Drennen et al. | |
| 6,527,096 B2 | * | 3/2003 | Hoess et al. ............. | 192/219.5 |
| 6,533,082 B2 | * | 3/2003 | Gill et al. .................... | 188/156 |
| 6,550,598 B2 | | 4/2003 | Drennen | |
| 6,552,967 B1 | | 4/2003 | Tsutsui et al. | |

* cited by examiner

Primary Examiner—Douglas C. Butler
Assistant Examiner—Bradley King
(74) Attorney, Agent, or Firm—Michael D. Smith

(57) ABSTRACT

A manually operated cable release apparatus, suitable for use in an electrically actuated brake, is provided for a locking mechanism having a shaft that is rotatable about an axis of rotation of the shaft, between a first angular position where the locking mechanism is disengaged, and a second angular position where the locking mechanism is engaged. The cable release apparatus includes a lever having one end thereof fixedly attached to the shaft and extending outward from the shaft for applying a force to the lever, for rotating the shaft back and forth through an angular displacement between the first and second angular positions. A cable is operatively connected to the lever in a manner allowing the shaft to rotate freely back and forth through the angular displacement of the shaft between the first and second angular positions without movement of the cable from a non-engaged position of the cable, and for engaging and applying a tensile force from the cable to the lever for rotating the shaft to the first position from any point in the angular displacement between the first and second angular positions of the shaft.

15 Claims, 5 Drawing Sheets

MANUAL CABLE RELEASE APPARATUS FOR A MOTOR ACTUATED PARK BRAKE FOR A VEHICLE

RELATED APPLICATION

This application is a Continuation-in-Part of a Non-Provisional U.S. patent application bearing the Ser. No. 10/040,521, filed on Jan. 7, 2002, entitled "MOTOR ACTUATED PARK BRAKE FOR A VEHICLE," by David B. Drennen, et al, which in turn claims the benefit of a Provisional U.S. Patent Application Ser. No. 60/261,954 filed on Jan. 16, 2001 entitled "INTEGRAL MOTOR ACTUATED PARK BRAKE FOR ELECTRIC PARK BRAKE ACTUATOR SYSTEMS" by David B. Drennen, et al, with the entire disclosure of both the above cited Provisional and Non-Provisional Applications being incorporated by reference, herein.

TECHNICAL FIELD OF THE INVENTION

This invention relates to vehicle brakes, and more particularly to a manual cable operated release apparatus for electrically actuated emergency/parking brakes.

BACKGROUND OF THE INVENTION

A typical vehicle brake system includes an emergency/park brake apparatus that is used to hold the vehicle in position while it is parked, or to stop the vehicle in the event the primary braking system fails. In some modern vehicles, the emergency/park brake apparatus is normally electrically actuated.

In such an electrically actuated brake apparatus, an electrical drive motor is used during normal emergency and park brake operations to drive a ball screw, or other drive device, to engage the brake. When electrical power is removed from the motor, however, spring forces inherent in the brake apparatus can cause back-driving of the drive device and drive motor, thereby releasing the brake. Vibration increases this inherent tendency.

To ensure that the drive device does not inadvertently back-drive and release the brake, an electrically actuated locking mechanism is incorporated into the drive devices of some electrically actuated brakes. While the addition of the locking mechanism solves the problem of inadvertent back-driving, it creates another problem, in that it may be desirable or necessary in some instances to release the brake under circumstances when electrical power is not available.

What is needed, therefore, is an improved electrically actuated brake apparatus that can be electrically locked against release when power is removed, and having provisions for manually unlocking and releasing the brake apparatus, in those circumstances when electrical power is not available.

SUMMARY OF THE INVENTION

Our invention provides a manually operated cable release apparatus, suitable for use in an electrically actuated brake, for a locking mechanism having a shaft that is rotatable about an axis of rotation of the shaft between a first angular position, where the locking mechanism is disengaged, and a second angular position where the locking mechanism is engaged.

In one form of our invention, the cable release apparatus includes a lever having one end thereof fixedly attached to the shaft and extending outward from the shaft for applying a force to the lever, for rotating the shaft back and forth through an angular displacement between the first and second angular positions. A cable is operatively connected to the lever for allowing the shaft to rotate freely back and forth through the angular displacement of the shaft between the first and second angular positions without movement of the cable from a non-engaged position of the cable, and for engaging and applying a tensile force from the cable to the lever for rotating the shaft to the first position from any point in the angular displacement between the first and second angular positions of the shaft.

In another form of our invention, an improved method and apparatus are provided for electrically actuating a brake, in a manner allowing the brake to be selectively electrically locked against release when power is removed, through the use of a locking mechanism in the form of a jaw-tooth clutch operatively installed between the shaft and the housing of a drive motor, for engaging the brake. A manual cable release apparatus is integrated into the brake apparatus for unlocking and releasing the brake, should the drive motor or the power source connected to the drive motor malfunction, or in the event that electrical power is not available for some other reason.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION OF THE PRESENTLY PREFERRED EMBODIMENTS

Figure 1:
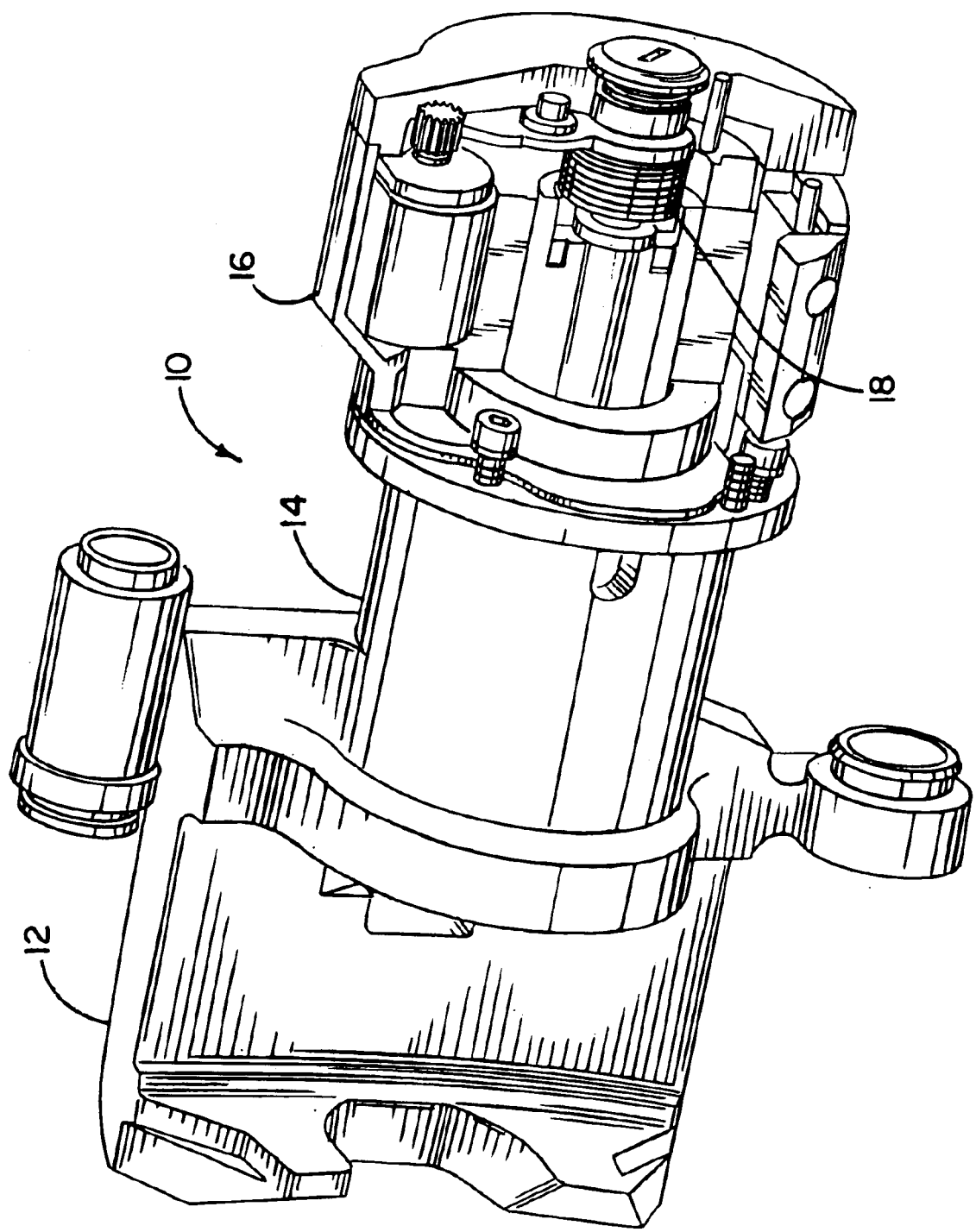
FIG. 1 is a perspective view of an exemplary embodiment of a brake apparatus according to our invention.

FIGS. 1, 2, and 5–9 depict an exemplary embodiment of a brake apparatus 10, according to our invention, having brake means, in the form of a disk brake caliper 12, a drive train 14, an electric drive motor 16, a locking mechanism in the form of a jaw-tooth clutch 18, and a manual cable release apparatus 64. The drive motor 16 has a shaft 20 that is rotatable about an axis 22 and operatively attached to the drive train 14 for actuation of the disk brake caliper 12 by rotation of the shaft 20. The jaw-tooth clutch 18 is configured for selectively locking the shaft 20 against rotation about the axis 22.

The drive motor 16 includes a housing 24 disposed about the shaft 20. The drive motor further includes a rotor 26 affixed to the shaft 20, and a stator 28 disposed about the rotor 26 and affixed to the housing 24. The drive motor stator 28 is adapted to receive electrical current from a first power source (not shown). Providing electrical power to the stator 28 causes the rotor 26 to drive the shaft 20 in a first direction about the axis 22 for engaging the brake 12, or in a second direction for disengaging the brake 12. The direction of rotation of the shaft 20 is determined by the nature and polarity of the electrical current signal provided to the stator 28.

The jaw-tooth clutch 18 includes a rotating jaw 30 operatively attached to the shaft 20 for rotation about the axis 22, and a translating jaw 32 operatively connected to the housing 24 for non-rotatable translation along the axis 22 and into engagement with the rotating jaw 30. The rotating and translating jaws 30, 32 each have axially directed mating teeth 31, 33 affixed on mating surfaces of the jaws 30, 32 that allow the jaw-tooth clutch to lock the shaft 20 against rotation about the axis 22. The rotating jaw 30 is affixed to the right end, as shown in FIG. 2, of the rotor 26 of the drive motor 16.

It is preferable that the translating jaw 32 be made from a suitable material, and that the teeth 33 on the translating jaw 32 be configured such that, if the clutch 18 should ever inadvertently engage, the drive motor 16 will have sufficient torque to shear off the teeth 33. In this manner, although the locking function of the jaw tooth clutch 18 would be lost, the brake apparatus 10 would remain otherwise operable. We contemplate that a polymer material, such as NYLON, would be well suited for fabricating the translating jaw 32, to allow the teeth 33 to be sheared off by the drive motor 16 following an inadvertent engagement of the clutch 18.

A cam shaft 34 is disposed about the shaft 20 of the drive motor 16 and has a bore for passage of the shaft 20. The bore provides a clearance fit with the shaft 20, so that the cam shaft 34 and shaft 20 are rotatable independently from one another, about the axis 22.

Figure 2:
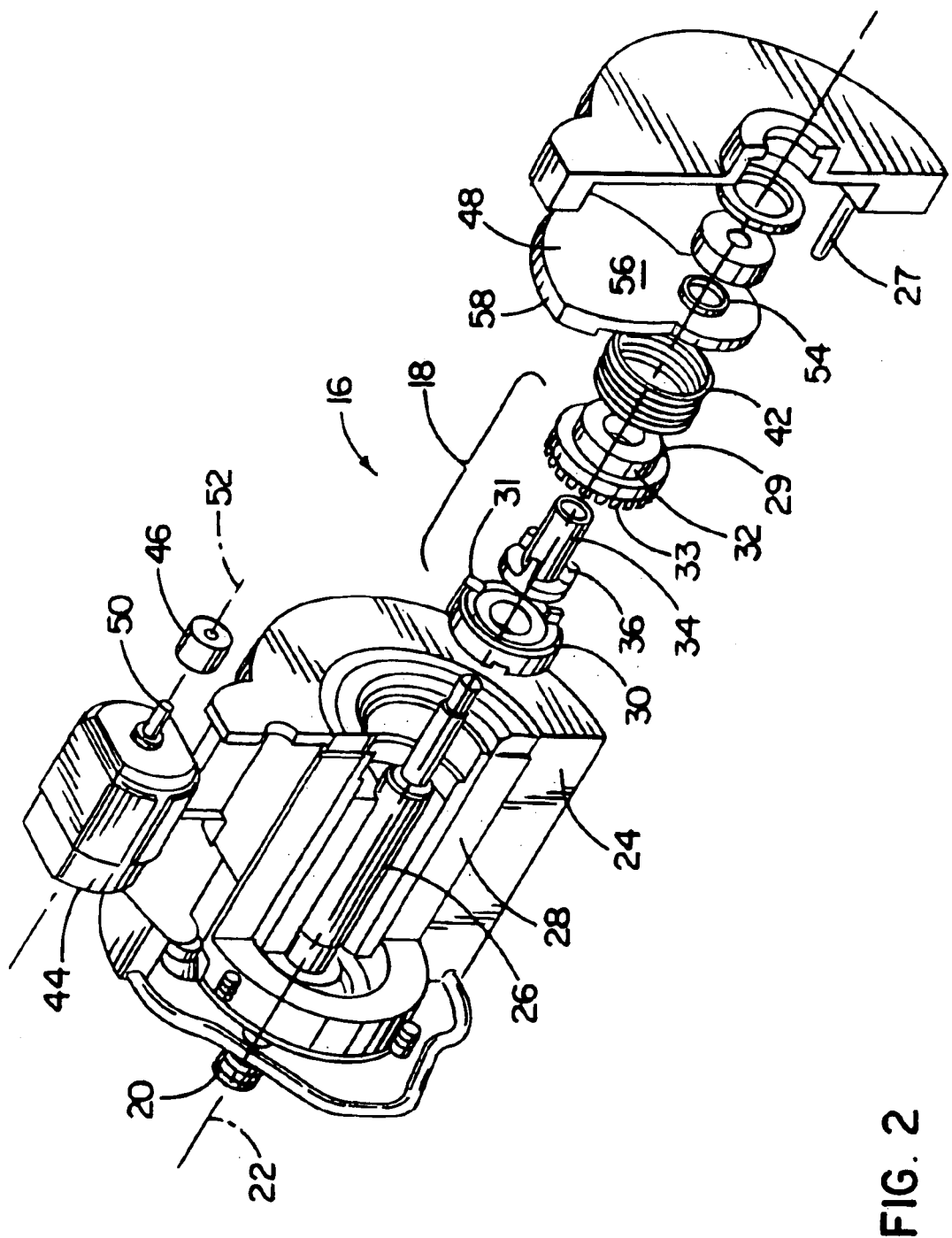
FIG. 2 is an exploded perspective view of a portion of the apparatus depicted in FIG. 1, according to our invention.
Figure 3:
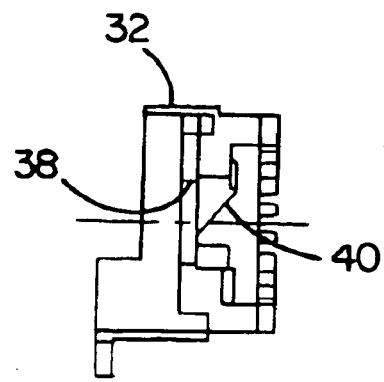
FIGS. 3–5 are views of component parts of a jaw-tooth clutch assembly used for locking the brake apparatus of FIG. 1, and a mechanism for engaging and disengaging the jaw-tooth clutch, according to our invention.
Figure 4:
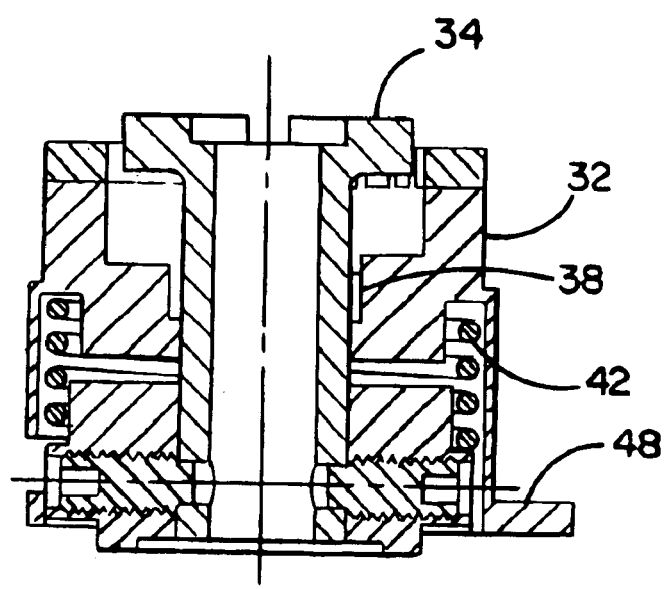

As shown in FIGS. 2, 3, and 4, the cam shaft 34 has an outer periphery configured to provide a cam surface in the form of three axially extending lugs 36. The translating jaw 32 includes a bore 38 therein configured for sliding passage of the cam shaft 34. The bore 38 of the translating jaw 32 defines a ramp surface 40 configured for mating engagement with the lugs 36 forming the cam surface of the cam shaft 34. The lugs 36 and the ramp surface 40 are cooperatively configured such that rotation of the cam shaft in a clockwise direction about the axis 22, as viewed from the right end of the drive motor 16 as depicted in FIG. 2, causes the lugs 36 to engage the ramp surface 40 and drive the translating jaw 32 away from the rotating jaw 30. Rotation of the camshaft 34 in a counter-clockwise direction about the axis 22 causes the lugs 36 to move into the bore 38 of the translating jaw 32 along the ramp surface 40, and effectively disengage from driving engagement with the ramp surface 40 in a manner allowing the translating jaw 32 to move toward the rotatable jaw 30. A spring 42 provides a biasing force urging the translating jaw 32 to move toward engagement with the rotating jaw 30 of the jaw-tooth clutch 18. A guide pin 27 extends from the housing 24 and slidingly engages a slot 29 in the translating jaw 32 to prevent the translating jaw 32 from rotating about the axis 22.

It is preferred that the spring 42 provide sufficient preload to keep the translating jaw 32 clamped against the rotating jaw 30 while the clutch 18 is engaged, against inadvertent separation due to external forces such as vibration. Such vibration might be caused, for example, by an impact wrench applied to the vehicle lug nuts during a tire change or maintenance and repair operations. It could be undesirable in such circumstances to have the brake apparatus 10 unlock due to disengagement of the clutch 18.

The brake apparatus 10 further includes both electrical and manual clutch drive means for rotating the cam shaft 34 in a first and a second direction about the axis 22, through an angular displacement between a first angular position where the jaw-tooth clutch 18 is disengaged, and a second angular position where the jaw-tooth clutch 18 is engaged.

Figure 5:
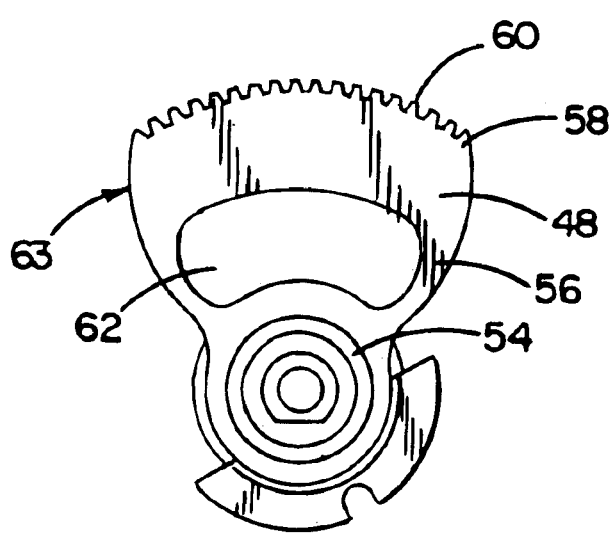

A clutch actuation motor 44 is operatively attached to the cam shaft 34 by a pinion 46 and a sector gear 48 for rotating the cam shaft 34 in the first and second directions about the axis 22. The clutch actuation motor 44 includes a shaft 50 extending therefrom and rotatable about a second axis 52, extending parallel to the axis 22 of the drive motor 16. The sector gear 48 has a hub 54 for attachment to the cam shaft 34, and a web 56 extending radially outward from the hub 54 to a rim 58 having the gear teeth 60 extending therefrom, as shown in FIG. 5, for engagement with the pinion 46.

The spring 42, in the form of a helical compression spring, is disposed between the translating jaw 32 of the jaw-tooth clutch 18 the sector gear 48. The web 56 of the sector gear 48 includes a point of contact 63 along the left edge of the web 56 that travels in an arcuate shaped path as the sector gear 48 pivots about the axis 22. The point of contact 63 is adapted for operative contact with other components of the manually operable cable release apparatus 64 in a manner described in more detail below, to thereby allow the sector gear 48 to be used as a cable-operated lever for rotating the cam shaft 34 to disengage the jaw tooth clutch 18, in the event that the clutch actuation motor 44 loses power or malfunctions.

The brake 12 is engaged and locked by rotating the shaft 20 of the drive motor 16 in a direction causing the drive train 14 to engage the brake, by applying power from the first power source to the drive motor 16, and, after the brake 12 is engaged, applying power to the clutch actuation motor 44 to rotate the sector gear 48 and cam shaft 34 in a first direction about the axis 22 for moving the translating jaw 32 into engagement with the rotating jaw 30, to thereby lock the shaft 20 against rotation about the axis 22. This process is reversed to unlock the jaw-tooth clutch 18 and disengage the brake 12.

It is preferable that the clutch actuation motor 44 be driven from a power source that is independent from the power source used for driving the drive motor 16, so that the jaw-tooth clutch 18 can still be unlocked with the clutch actuation motor 44 if power is lost from the power source used for driving the drive motor 16.

We also contemplate a method of operation wherein power is not maintained to the drive motor 16 after the shaft 20 is locked by the jaw-tooth clutch 18, to thereby conserve electrical power. It is also not necessary to maintain power to the clutch actuation motor 44 after the shaft is locked, because the jaw-tooth clutch 18 locks the shaft 20 in position against being back driven or moving as a result of vibration.

To ensure that the teeth 31, 33 on the rotating and translating jaws 30, 32 fully engage, we contemplate a method of operation including rotating the shaft 20 of the drive motor 16 through an additional angular distance after moving the translating jaw 32 into engagement with the rotating jaw 30, to thereby ensure locking engagement of the rotating and translating jaws 30, 32.

FIGS. 5 through 9 depict an exemplary embodiment of a cable release apparatus 64 for a locking mechanism, in the form of the jaw-tooth clutch 18 for the brake assembly 10 described above, that allows the clutch 18 to be disengaged manually by pulling on the end of the brake release cable 66 extending from the end bell 68 of the housing 24. The cable release apparatus 64 includes the cable 66, the sector gear 48, a cam 70, a helical compression spring 72 disposed about the cable 66, the end bell 68 and a groove 74 therein, and the spring retainer 76 for retaining the compression spring 72, the cable 66, and the cam 70 in the groove 74 of the end bell 68 of the housing 24.

As shown in FIGS. 5, 6, 7 and 9, the end bell 68 of the housing 24 includes a guide means in the form of a groove 74 having an arcuate shape corresponding to the arcuate path of the point of contact 63 on the sector gear 48. The cam 70 includes a first section 78 at one end of the cam 70 configured to bear against the point of contact 63 on the sector gear 48, and a second section 80 at the opposite end of the cam 70 configured to engage and be guided by the arcuate groove 74 in the end bell 68 of the housing 24. The cam 70 also includes a slot 82 therein for receiving the cable 66. A bullet end (not shown) on the cable 66 bears against a side surface of the cam 70 at the end of the slot 82 for preventing the cable from pulling through and free of the cam 70.

The cable 66 and the helical compression spring 72 surrounding the cable 66 fit within and are guided by the groove 74 of the end bell 68. With the cable 66, spring 72 and cam 70 installed in the groove 74, one end of the compression spring 72 bears against the cam 70, and the other end of the compression spring 72 bears against a spring stop surface on the end of a cable support 84 of the housing 24 inserted into the end bell 68 to guide and reinforce the cable 66 at the point of exit of the cable 66 from the housing 24.

Figure 8:
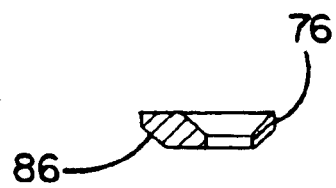
Figure 9:
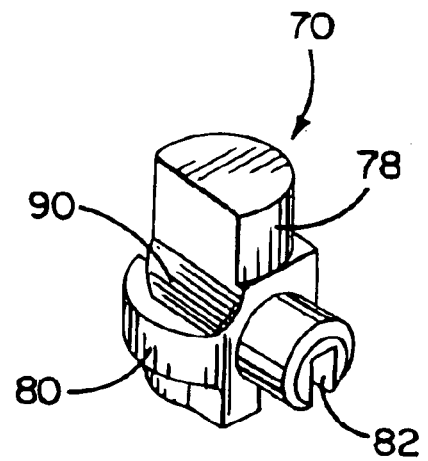

The spring 72 and cable 66 are retained within the groove 74 by a lip 86 on the spring keeper 76, shown in FIG. 8, that extends partially over the spring 72, when the spring keeper 76 is secured to the end bell 68 by several screws 88. The lip 86 of the spring keeper 76 also bears against an axial retention surface 90 of the cam 70.

Figure 6:
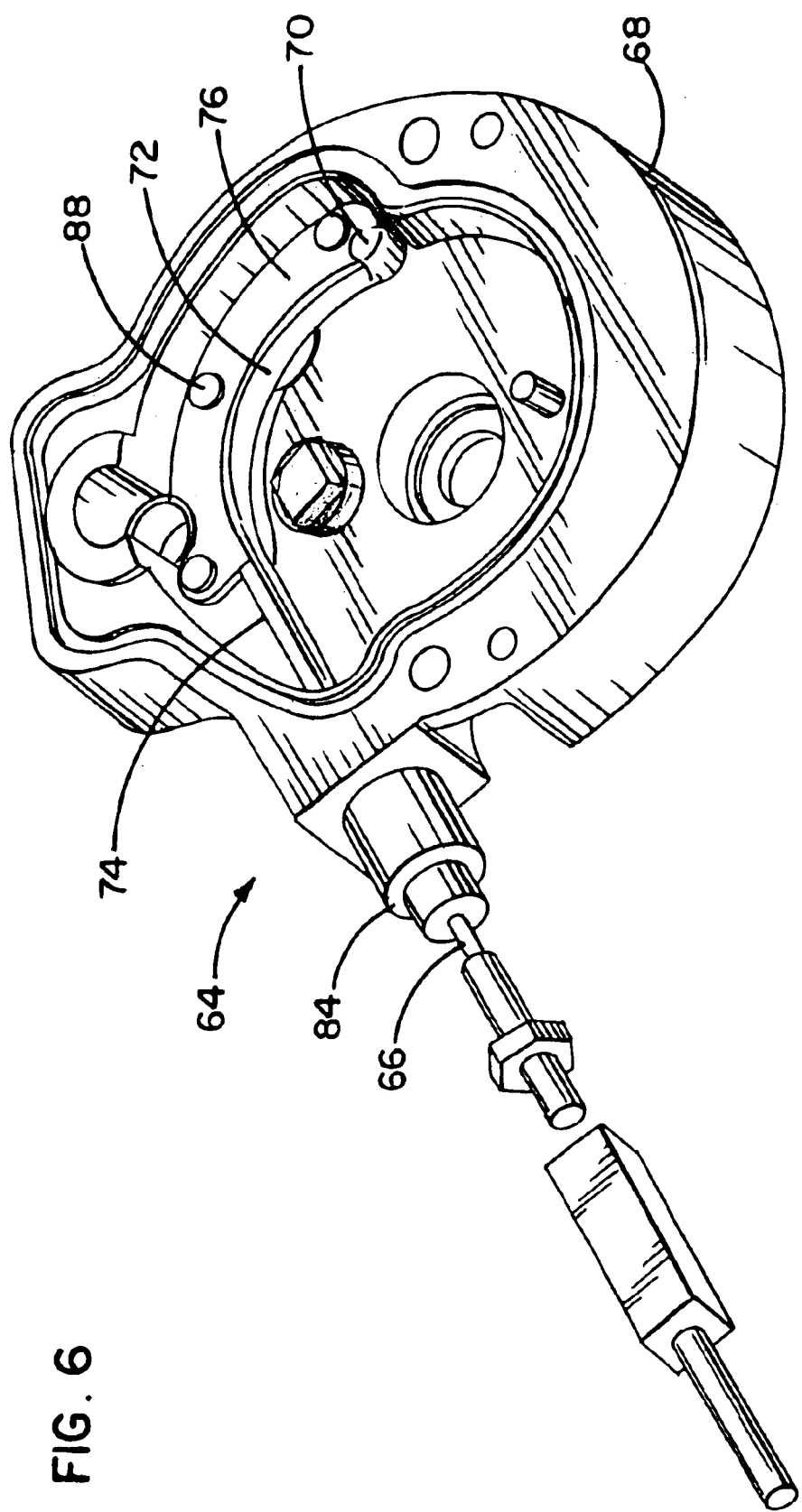
FIG. 6 is an isometric internal view of an end bell of a housing of the brake apparatus showing a portion of a cable release apparatus, according to our invention.
Figure 7:
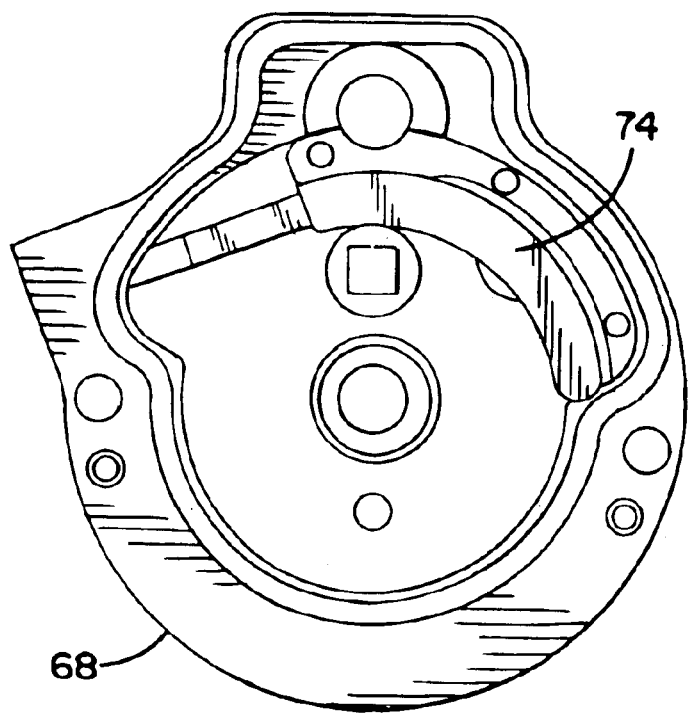
FIGS. 7–9 are views of component parts of the cable release apparatus of FIG. 6.

With the components of the cable release apparatus 64 assembled as described above, the cam 70 is biased by the compression spring 72 to move to a position at the right end of the groove 74, as depicted in FIG. 6. With the cam 70 positioned at the right end of the groove 74, the sector gear 48 can move freely back and forth to any angular position corresponding to the angular displacement of the cam shaft 34 between the first and second angular positions of the cam shaft 34, without movement of the cable 66 or the cam 70 relative to the housing 24, as the clutch actuation motor 44 drives the sector gear 48 and cam shaft 34 back and forth through the angular displacement from the first angular position shown in FIG. 5, where the jaw-tooth clutch 18 is fully disengaged, to the second angular position where the sector gear 48 and cam shaft 34 are rotated far enough in a counter-clockwise direction from the first angular position, as shown in FIG. 5, that the jaw-tooth clutch 18 is fully engaged.

When the cable 66 is pulled to manually disengage the jaw-tooth clutch 18, the cable 66 pulls the cam 70 along the arcuate groove 74 in the housing 24 to a point where the first section 78 of the cam 70 comes into contact with the point of contact 63 on the left edge, as depicted in FIG. 5, of the web 56 of the sector gear 48. As the cable 66 is pulled farther, after the cam 70 engages the point of contact 63, the sector gear 48 functions as a lever to rotate the cam shaft 34 from wherever it is positioned within the angular displacement between the first and second angular positions, toward the first angular position in which the jaw-tooth clutch 18 is fully disengaged. When tension on the cable 66 is released, the spring 72 surrounding the cable 66 within the housing 24 drives the cam 70 out of engagement with the point of contact 63 on the sector gear 48, and back to the right end, as shown in FIG. 6, of the groove 74 in the housing 24 to the non-engaged position of the cable 66.

Those having skill in the art will recognize that, while we presently consider it preferable to have the components according to our invention arranged as described above, we contemplate many other arrangements within the scope of our invention.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A cable release apparatus for a locking mechanism having a shaft rotatable about an axis of the shaft between a first angular position where the locking mechanism is disengaged and a second position where the locking mechanism is engaged, the cable release apparatus comprising:

a lever having one end thereof fixedly attached to the shaft and extending outward from the shaft for applying a force to the lever for rotating the shaft back and forth through an angular displacement between the first and second angular positions;

the lever including an edge having a point of contact traveling in an arcuate path as the lever rotates the shaft back and forth through the angular displacement between the first and second angular positions;

cable means including a cable operatively connected to the lever for allowing the shaft to rotate freely back and forth through the angular displacement of the shaft between the first and second angular positions without movement of the cable from a non-engaged position of the cable, and for engaging and applying a tensile force from the cable to the lever for rotating the shaft to the first position from any point in the angular displacement between the first and second angular positions of the shaft;

spring means for urging the cable toward the non-engaged position of the cable;

means for operatively applying tension from the cable to the point of contact on the lever for moving the shaft in a direction toward the second angular position;

a cam attached to the cable for engaging the point of contact on the lever;

guide means for guiding the cam along an arcuate path corresponding to the arcuate path of the point of contact of the lever; and a housing attached to the locking mechanism, and having a surface adjacent the lever defining the guide means;

the guide means including a groove in the surface of the housing having an arcuate shape corresponding to the arcuate shaped path of the point of contact on the lever;

the cam having a first section thereof configured for engaging the point of contact on the lever, and a second section thereof slidingly supported in the groove in the housing.

2. The cable release apparatus of claim 1 wherein the cable adjacent the cam is disposed within and guided by the groove in the housing.

3. The cable release apparatus of claim 2 further including a spring stop in the groove in the housing, and the spring means is comprised of a helical compression spring having the cable passing therethrough, one end of the spring bearing against the cam, and the other end of the spring bearing against the spring stop of the groove in the housing.

4. The cable release apparatus of claim 3 further including a spring keeper attached to the housing for retaining the spring within the groove in the housing.

5. The cable release apparatus of claim 4 wherein the spring keeper includes a lip contoured for bearing against a portion of the outer surface of the helical spring for retaining the spring in the groove of the housing, and the cam includes a retaining surface mating with the lip of the spring keeper when the cam is installed in the groove, whereby the lip of the spring keeper also retains the cam in the groove.

6. A brake apparatus comprising:

brake means including a drive motor having a shaft that is rotatable about an axis for actuation of the brake means, and a housing disposed about the shaft;

jaw-tooth clutch means for selectively locking the shaft against rotation about the axis, the jaw-tooth clutch means having a rotating jaw operatively attached to the shaft for rotation about the axis, and a translating jaw operatively connected to the housing for non-rotatable translation along the axis and into engagement with the rotating jaw, the rotating and translating jaws each having axially directed mating teeth affixed on mating surfaces of the jaws, the jaw-tooth clutch thereby locking the shaft against rotation about the axis;

means for moving the translating jaw along the axis for selectively engaging and disengaging the mating teeth of the jaws of the jaw-tooth clutch;

the means for moving the translating jaw along the axis having a cam shaft disposed about the shaft of the drive motor and rotatable independently thereof about the axis, the cam shaft having on an outer periphery thereof a cam surface, the translating jaw having a bore therein configured for passage therethrough of the cam shaft, the bore defining a ramp surface configured for mating engagement with the cam surface of the cam shaft, the cam surface and ramp surface being cooperatively configured such that rotation of the cam shaft in a first direction about the axis causes the cam surface to engage the ramp surface and drive the translating jaw away from the rotating jaw, and rotation of the camshaft in a second direction about the axis causes the cam surface to disengage from driving engagement with the ramp surface, thereby allowing the translating jaw to move toward the rotatable jaw;

the means for moving the translating jaw also having means for rotating the cam shaft in a first and a second direction about the axis through an angular displacement between a first angular position of the cam shaft where the jaw-tooth clutch means is disengaged and a second position of the cam shaft where the jaw-tooth clutch means is engaged;

the means for rotating the cam shaft having a clutch actuation motor operatively attached to the cam shaft by clutch drive means for rotating the cam shaft in the first and second directions about the axis, the clutch actuation motor including a shaft extending therefrom and rotatable about a second axis;

the clutch drive means including a sector gear having a hub for attachment to the cam shaft and a web extending radially outward from the hub to a rim having the gear teeth extending therefrom, and a pinion affixed to the clutch actuation motor shaft, the pinion having gear teeth in mating engagement with the gear teeth extending from the cam shaft such that rotation of the shaft of the clutch actuation motor about the second axis rotates the cam shaft about the first axis, to thereby selectively engage and disengage the jaw-tooth clutch; and a cable release apparatus having cable means including a cable operatively connected to the sector gear for allowing the cam shaft to rotate freely back and forth through the angular displacement of the cam shaft between the first and second angular positions without movement of the cable from a non-engaged position of the cable, and for engaging and applying a tensile force from the cable to the sector gear for rotating the cam shaft to the first position from any point in the angular displacement between the first and second angular positions of the cam shaft.

7. The brake apparatus of claim 6 further including spring means for urging the cable toward the non-engaged position of the cable.

8. The brake apparatus of claim 7 wherein:

the sector gear includes an edge having a point of contact traveling in an arcuate path as the sector gear rotates the shaft back and forth through the angular displacement between the first and second angular positions; and means for operatively applying tension from the cable to the point of contact on the sector gear for moving the shaft in a direction toward the second angular position.

9. The brake apparatus of claim 8 further including a cam attached to the cable for engaging the point of contact on the sector gear, and guide means for guiding the cam along an arcuate path corresponding to the arcuate path of the point of contact of the sector gear.

10. The brake apparatus of claim 9 further including a housing attached to the locking mechanism, and having a surface adjacent the sector gear defining the guide means.

11. The brake apparatus of claim 10 wherein the guide means includes a groove in the surface of the housing having an arcuate shape corresponding to the arcuate shaped path of the point of contact on the sector gear, the cam having a first section thereof configured for engaging the point of contact on the sector gear, and a second section thereof slidingly supported in the groove in the housing.

12. The brake apparatus of claim 11 wherein the cable adjacent the cam is disposed within and guided by the groove in the housing.

13. The brake apparatus of claim 12 wherein the groove in the housing includes a spring stop, and the spring means is comprised of a helical compression spring having the cable passing therethrough, one end of the spring bearing against the cam, and the other end of the spring bearing against the spring stop of the groove in the housing.

14. The brake apparatus of claim 13 further including a spring keeper attached to the housing for retaining the spring within the groove in the housing.

15. The brake apparatus of claim 14 wherein the spring keeper includes a lip contoured for bearing against a portion of the outer surface of the helical spring for retaining the spring in the groove of the housing, and the cam includes a retaining surface mating with lip of the spring retainer when the cam is installed in the groove, whereby the lip of the spring keeper also retains the cam in the groove.

* * * * *